(12) United States Patent
Watanabe (10) Patent No.: US 7,889,469 B2
(45) Date of Patent: Feb. 15, 2011

(54) ELECTROSTATIC DISCHARGE PROTECTION CIRCUIT FOR PROTECTING SEMICONDUCTOR DEVICE

(75) Inventor: Kentaro Watanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 318 days.

(21) Appl. No.: 12/236,045

(22) Filed: Sep. 23, 2008

(65) Prior Publication Data
US 2009/0086393 A1 Apr. 2, 2009

(30) Foreign Application Priority Data
Sep. 26, 2007 (JP) ............................. 2007-250133

(51) Int. Cl.
*H02H 3/22* (2006.01)
(52) U.S. Cl. ........................................ 361/56; 361/111
(58) Field of Classification Search .................. 361/56, 361/58, 111
See application file for complete search history.

(56) References Cited

U.S. PATENT DOCUMENTS

| 7,154,719 | B2* | 12/2006 | Krasin ........................... 361/56 |
| 7,595,968 | B2* | 9/2009 | Hung et al. ..................... 361/56 |
| 2004/0070901 | A1 | 4/2004 | Umeda | |
| 2005/0135033 | A1 | 6/2005 | Kitagawa et al. | |
| 2007/0047162 | A1 | 3/2007 | Watanabe et al. | |

FOREIGN PATENT DOCUMENTS

| JP | 08-275375 | 10/1996 |
| JP | 2001-308200 | 11/2001 |
| JP | 2005-064374 | 3/2005 |
| WO | 2005/094522 | 10/2005 |

OTHER PUBLICATIONS

Japanese Office Action for 2007-250133 mailed on Dec. 22, 2009.
K. Watanabe et al, "New Protection Techniques and Test Chip Design for Achieving High CDM Robustness", EOS/EDS Symposium, pp. 332-338, 2008.

* cited by examiner

*Primary Examiner*—Danny Nguyen
(74) *Attorney, Agent, or Firm*—Turocy & Watson, LLP (57) ABSTRACT

A discharge circuit holds the potential difference between a power supply terminal and reference potential terminal at a predetermined value. The gates of a first pMOSFET and first nMOSFET are connected to an input terminal. A second pMOSFET is connected between the first pMOSFET and power supply terminal, and has a gate to which a first signal is supplied. A second nMOSFET is connected between the first nMOSFET and reference potential terminal, and has a gate to which a second signal is supplied. A detection circuit outputs the first signal which turns on the second pMOSFET and the second signal which turns on the second nMOSFET, while the potential difference is held at the predetermined value. The detection circuit outputs the first signal which turns off the second pMOSFET and the second signal which turns off the second nMOSFET, while the potential difference deviates from the predetermined value.

20 Claims, 3 Drawing Sheets

ELECTROSTATIC DISCHARGE PROTECTION CIRCUIT FOR PROTECTING SEMICONDUCTOR DEVICE

CROSS-REFERENCE TO RELATED APPLICATIONS

This application is based upon and claims the benefit of priority from prior Japanese Patent Application No. 2007-250133, filed Sep. 26, 2007, the entire contents of which are incorporated herein by reference.

BACKGROUND OF THE INVENTION

1. Field of the Invention

The present invention relates to an electrostatic discharge (ESD) protection circuit, e.g., an ESD protection circuit for protecting a semiconductor device from an overcurrent such as a surge that may be applied to the semiconductor device.

2. Description of the Related Art

An ESD protection circuit for protecting an internal circuit from an overcurrent applied to a pad is usually formed in an I/O portion of a semiconductor device such as a large-scale integrated circuit (LSI). This protection circuit is formed for each input pin, an output pin, and a power supply pin of a semiconductor device.

An example of a protection circuit connected to an input pin will be explained below. The protection circuit includes, e.g., an input pad, two diodes, an input buffer, and an inter-power supply protection element. The two diodes are connected in series. This series-connected structure has an anode connected to a common potential (ground potential or reference potential (VSS)) line, and a cathode connected to a power supply potential (VDD) line. The input buffer comprises n- and p-type metal oxide semiconductor field effect transistors (MOSFETs) connected in series. That is, one terminal (drain terminal) of the n-type MOSFET and one terminal (drain terminal) of the p-type MOSFET are connected, the other terminal (source terminal) of the n-type MOSFET is connected to the common potential line, and the other terminal (source terminal) of the p-type MOSFET is connected to the power supply potential line. The input pad is connected to the gate terminals of the two MOSFETs. The inter-power supply protection element is connected between the power supply potential line and common potential line. The inter-power supply protection element holds the potential difference between the power supply potential line and common potential line constant.

When a surge current having a positive potential with respect to the common potential is input to the input pad, for example, the potential of the input pad rises. Then, the potential of the power supply potential line connected to the input terminal via the diodes also rises. Accordingly, the inter-power supply protection element operates to hold the potential difference between the power supply potential line and common potential line at a constant value by discharging the surge current. After the protection circuit thus operates, it is possible to prevent electrostatic destruction of a circuit formed between the power supply potential line and common potential line by holding the potential difference between the input pad and common potential line constant.

If, however, the response speed of the inter-power supply protection element to the surge current is not sufficiently higher than the rising speed of the surge current, it is sometimes impossible to protect the circuit. In this case, the inter-power supply protection element cannot discharge the surge current applied to the input pad, and the potential of the common potential line rises. Consequently, a high voltage is applied between the source and gate terminals of the n-type MOSFET. If this potential difference exceeds a breakdown voltage corresponding to the characteristics of the n-type MOSFET, the n-type MOSFET is destroyed. When a negative potential based on the common potential is applied to the input pad, the same mechanism as described above may destroy the p-type MOSFET.

This problem is highly likely to become serious in the implementation of a protection circuit to be adapted to a test method called a charged device model (CDM). The CDM is a kind of test method, and one feature of this method is that a steep surge current flows.

As an example of prior art references relevant to the invention of this application, Jpn. Pat. Appln. KOKAI Publication No. 08-275375 describes an electrostatic discharge protection circuit in which a single transistor is connected between circuit nodes of a Vcc pin and Vss pin.

BRIEF SUMMARY OF THE INVENTION

According to a first aspect of the present invention, there is provided an electrostatic discharge (ESD) protection circuit comprising a first power supply potential terminal to which a first power supply potential is applied; a reference potential terminal to which a reference potential is applied; an input terminal provided between the first power supply potential terminal and the reference potential terminal; a discharge circuit which holds a potential difference between the first power supply potential terminal and the reference potential terminal at a predetermined value; a first p-type MOSFET having a gate connected to the input terminal; a first n-type MOSFET having a gate connected to the input terminal; a second n-type MOSFET connected between the first n-type MOSFET and the reference potential terminal, and having a gate to which a first control signal is supplied; and a detection circuit connected between the first power supply potential terminal and the reference potential terminal, the detection circuit outputting the first control signal which turns on the second n-type MOSFET while the potential difference between the first power supply potential terminal and the reference potential terminals is held at the predetermined value, and outputting the first control signal which turns off the second n-type MOSFET while the potential difference between the first power supply potential terminal and the reference potential terminal deviates from the predetermined value.

According to a second aspect of the present invention, there is provided an electrostatic discharge (ESD) protection circuit comprising a first power supply potential terminal to which a first power supply potential is applied; a reference potential terminal to which a reference potential is applied; an output terminal provided between the first power supply potential terminal and the reference potential terminal; a discharge circuit which holds a potential difference between the first power supply potential terminal and the reference potential terminal at a predetermined value by discharging an overcurrent applied to one of the first power supply potential terminal and the reference potential terminal; a first p-type MOSFET having a gate to which a first signal is supplied; a first n-type MOSFET having a gate to which a second signal is supplied; a second n-type MOSFET connected between the first n-type MOSFET and the reference potential terminal, and having a gate to which a second control signal is supplied; and a detection circuit connected between the first power supply potential terminal and the reference potential terminal, the detection circuit outputting the first control signal which turns on the second n-type MOSFET while the potential difference between the first power supply potential terminal and the reference potential terminals is held at the predetermined value, and outputting the first control signal which turns off the second n-type MOSFET while the potential difference between the first power supply potential terminal and the reference potential terminal deviates from the predetermined value.

DETAILED DESCRIPTION OF THE INVENTION

Embodiments of the present invention will be explained below with reference to the accompanying drawing. Note that in the following explanation, the same reference numerals denote constituent elements having almost the same functions and arrangements, and a repetitive explanation will be made only when necessary. However, it should be noted that the figures are exemplary views, so the relationship between the thickness and planar dimension, the ratio of the thicknesses of layers, and the like are different from actual ones. Accordingly, practical thicknesses and dimensions should be judged by referring to the following explanation. Also, the individual figures of course include portions having different dimensional relationships and different dimensional ratios.

Note also that the embodiments to be explained below exemplarily disclose apparatuses and methods for embodying the technical idea of the present invention, and the technical idea of the present invention does not specify the materials, shapes, structures, layouts, and the like of components to those described below. The technical idea of the present invention can be variously changed within the scope of the appended claims.

First Embodiment

Figure 1:
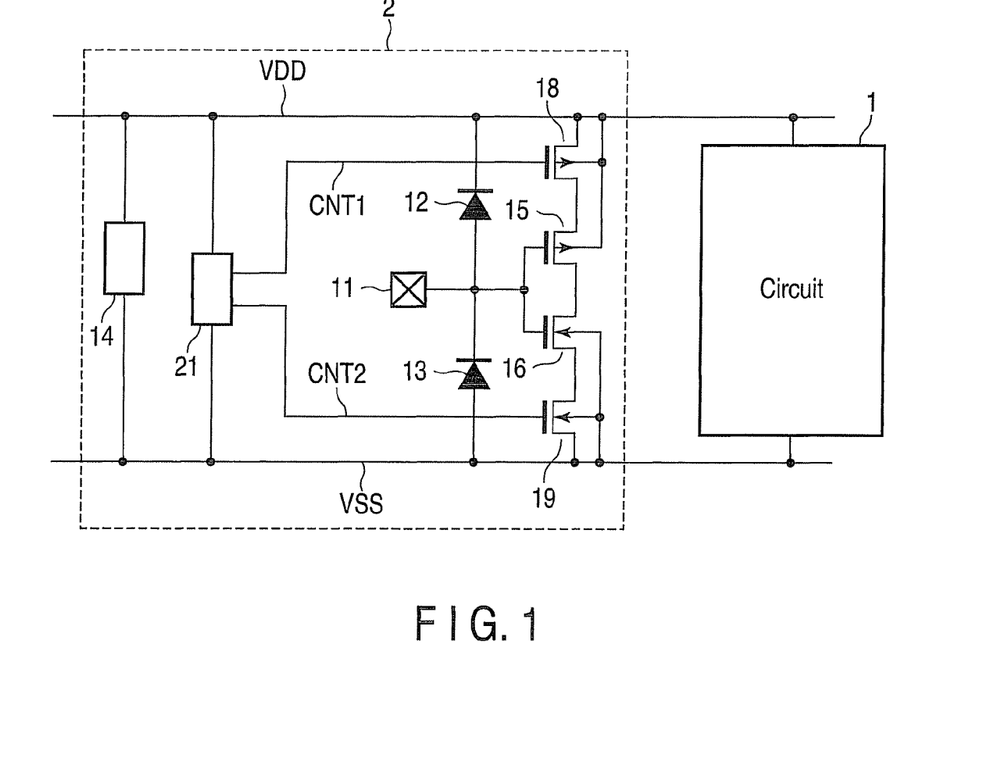
FIG. 1 is a circuit diagram schematically showing an ESD protection circuit according to a first embodiment.

FIG. 1 schematically shows an ESD protection circuit according to the first embodiment of the present invention. As shown in FIG. 1, a circuit (internal circuit) 1 that comprises various elements and performs a predetermined operation is connected between a power supply potential (potential VDD) line VDD and common potential (ground potential (potential VSS)) line VSS. A power supply circuit (not shown) or the like applies a constant power supply potential VDD to the power supply potential line VDD.

An ESD protection circuit (to be simply referred to as a protection circuit hereinafter) 2 is formed between the power supply potential line VDD and common potential line VSS. The protection circuit 2 forms at least a part of an I/O unit of the circuit 1, and prevents an overcurrent such as a surge current from being applied to the circuit 1.

In the protection circuit 2, an input pad 11 is connected to the anode of a diode 12. The cathode of the diode 12 is connected to the power supply potential line VDD. The input pad 11 receives an input signal to the circuit 1. The input pad 11 is connected to the cathode of a diode 13 as well. The anode of the diode 13 is connected to the common potential line VSS.

Figure 2:
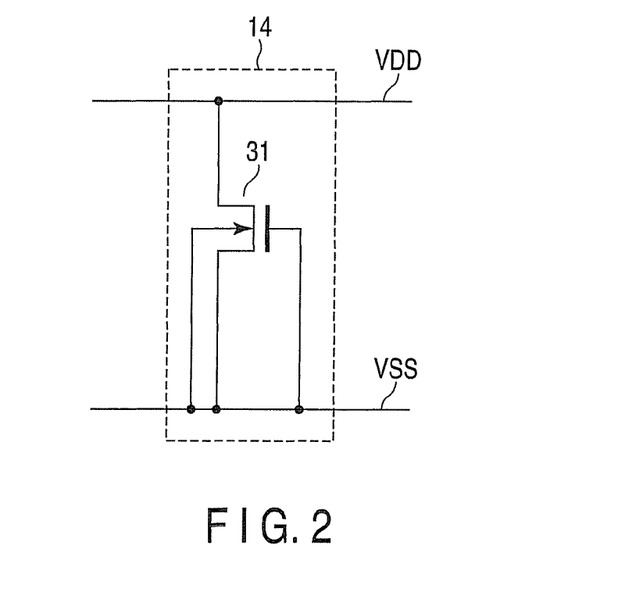
FIG. 2 is a circuit diagram showing an example of an inter-power supply protection circuit in the ESD protection circuit.

An inter-power supply protection circuit (discharge circuit) 14 is formed between the power supply potential line VDD and common potential line VSS. The inter-power supply protection circuit 14 holds the potential between the power supply potential line VDD and common potential line VSS constant. The inter-power supply protection circuit 14 has, e.g., an arrangement shown in FIG. 2. As shown in FIG. 2, the inter-power supply protection circuit 14 is a so-called GGNMOS (Gate Grounded N-type MOS) circuit. An n-type MOSFET 31 is connected between the power supply potential line VDD and common potential line VSS. The substrate and gate terminal of the transistor 31 are connected to the common potential line VSS.

As described above, the inter-power supply protection circuit 14 has the function of holding the potential between the power supply potential line VDD and common potential line VSS constant. If the potential difference between the power supply potential line VDD and common potential line VSS abruptly fluctuates, however, there is the possibility that the operation of the inter-power supply protection circuit 14 cannot follow the fluctuation and a period during which the potential difference is not held at a preset predetermined value is produced.

As shown in FIG. 1, the input pad 11 is connected to the gate terminals of a p-type MOSFET 15 and n-type MOSFET 16. The input pad 11 may also be connected to the gate terminals of the transistors 15 and 16 via resistors (not shown). One terminal (drain) of the transistor 15 and one terminal (drain) of the transistor 16 are connected to each other. The substrate of the transistor 15 is connected to the power supply potential line VDD. The substrate of the transistor 16 is connected to the common potential line VSS.

The other terminal of the transistor 15 is connected to one terminal (drain) of a p-type MOSFET 18. The other terminal (source) of the transistor 18 is connected to the power supply potential line VDD. The substrate of the transistor 18 is connected to the power supply potential line VDD.

The other terminal of the transistor 16 is connected to one terminal (drain) of an n-type MOSFET 19. The other terminal (source) and substrate of the transistor 19 are connected to the common potential line VSS. The substrate of the transistor 19 is connected to the common source line VSS.

A detection circuit 21 supplies control signals CNT1 and CNT2 to the gate terminals of the transistors 18 and 19, respectively. The detection circuit 21 normally outputs the control signals CNT1 and CNT2 for respectively keeping the transistors 18 and 19ON, i.e., a Low-level control signal CNT 1 and High-level control signal CNT2. During an overshoot period that can be produced in the initial stages of a serve current applied to the input pad 11, the detection circuit 21 outputs the control signals CNT1 and CNT2 for respectively turning off the transistors 18 and 19. That is, the detection circuit 21 outputs a High-level control signal CNT1 and Low-level control signal CNT2 in the overshoot period.

The detection circuit 21 need only be able to output the High-level control signal CNT1 and Low-level control signal CNT2 over a predetermined period from the start of application of the surge current. This period need only be longer than a period during which the inter-power supply protection circuit 14 cannot discharge the surge current from the start of application of the surge current. For example, the detection circuit 21 need only be capable of outputting the High-level control signal CNT1 and Low-level control signal CNT2 for about 1 ns from the generation of the surge current, in order to satisfy the CDM test standards.

Figure 3:
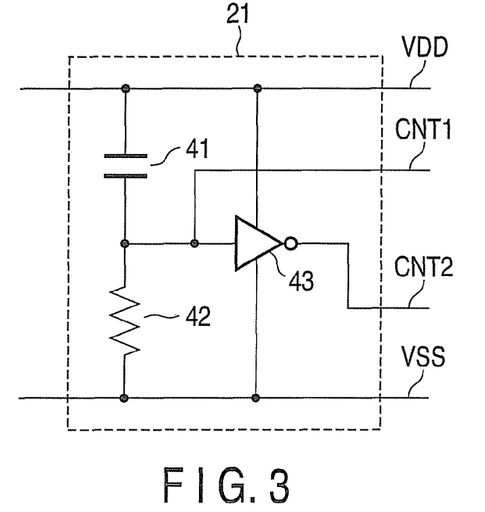
FIG. 3 is a circuit diagram showing an example of a detection circuit in the ESD protection circuit.

The detection circuit 21 has, for example, an arrangement shown in FIG. 3. As shown in FIG. 3, the detection circuit 21 is an RC trigger circuit. One terminal of a capacitor 41 is connected to the power supply potential line VDD. The other terminal of the capacitor 41 is connected to one terminal of a resistance element 42. The other terminal of the resistance element 42 is connected to the common potential line VSS. The connection node between the capacitor 41 and resistance element 42 is connected, as a terminal for outputting the control signal CNT1, to the gate terminal of the transistor 18. The connection node between the capacitor 41 and resistance element 42 is also connected to the input terminal of an inverter circuit 43 as well. The output terminal of the inverter circuit 43 is connected, as a terminal for outputting the control signal CNT2, to the gate terminal of the transistor 19. The power supply potential line VDD and common potential line VSS respectively supply the power supply potential VDD and common potential VSS to the inverter circuit 43.

To allow the detection circuit 21 to output the control signals CNT1 and CNT2 for respectively turning off the transistors 18 and 19 over 1 ns from the start of application of the surge current, the capacitance of the capacitor 41 is, e.g., 1 pF, and the resistance of the resistance element 42 is, e.g., 100Ω.

The detection circuit 21 shown in FIG. 3 can set the control signal CNT1 at High level and the control signal CNT2 at Low level over about 1 ns from the generation of the surge current. The circuit configuration as shown in FIG. 3 can implement the detection circuit 21 with a relatively small area.

The operation of the ESD protection circuit shown in FIG. 1 will be explained below with reference to FIG. 3. First, the terminal, which is positioned on the side of the power supply potential line, of the capacitor 41 shown in FIG. 3 is at High level because the power supply potential is always applied to this terminal. Therefore, capacitive coupling sets the terminal, which is positioned on the side of the resistance element, of the capacitor 41 at Low level. Accordingly, the control signals CNT1 and CNT2 are respectively at Low level and High level. As a consequence, the transistors 18 and 19 shown in FIG. 1 are ON.

Next, an example in which a surge current that is positive with respect to the potential (common potential) of the common potential line VSS is applied to the input pad 11 will be explained. The potential of the power supply potential line VDD rises when the surge current flows through the diode 12. The inter-power supply protection circuit 14 discharges this increased potential if the response of the inter-power supply protection circuit 14 is faster than the fluctuation in potential of the surge current. Consequently, the potential difference between the power supply potential line VDD and common potential line VSS is held at a constant value.

On the other hand, if the response speed of the inter-power supply protection circuit 14 is low, the surge current applied form the input pad 11 is not discharged. As a consequence, overshoot occurs in the waveform of the potential of the power supply potential line VDD, and the surge current flows into the common potential line VSS.

The detection circuit 21 detects this overshoot, and outputs the High-level control signal CNT1 and Low-level control signal CNT2. More specifically, the flow of the surge current raises the potential of the power supply potential line VDD. As a result, an electric current flows through the resistance element 42, and the potential of the connection node between the capacitor 41 and resistance element 42 rises to High level. Accordingly, the control signal CNT1 changes to High level, and the control signal CNT2 changes to Low level.

Since the control signal CNT2 has changed to Low level, the transistor 19 is turned off, and the source terminal of the transistor 16 is disconnected from the common potential line VSS and floats. This avoids a high potential, which is supposed to be applied between the source and gate of the transistor 16 if the transistor 19 is turned on, from being applied between the source and gate of the transistor 16.

Note that the substrate as well as the source terminal of the transistor 16 are connected to the common potential line as described above. Therefore, a high potential is applied between the substrate and gate terminal of the transistor 16 as well. However, the breakdown voltage between the substrate and gate terminal is generally higher than that between the source and gate terminals. Accordingly, even when there is no measure to cope with an overcurrent that cannot be discharged by the inter-power supply protection circuit 14, the surge current hardly destroys an insulating film (gate insulating film) between the substrate and gate terminal of the transistor 16.

The explanation up to this point has described the case where a positive potential is applied to the input pad 11. However, the above explanation similarly applies to the case where a negative potential is applied. That is, if it is detected that the inter-power supply protection circuit 14 has failed to discharge the surge current, the source terminal of the transistor 15 is disconnected form the power supply potential line VDD. This avoids a high voltage from being applied between the source and gate of the transistor 15.

A semiconductor chip normally has a plurality of input pads 11, and the protection circuit 2 is formed for each input pad 11. However, if a plurality of protection circuits 2 share the same power supply potential line VDD and the same common potential line VSS, they may also share one detection circuit 21.

Figure 4:
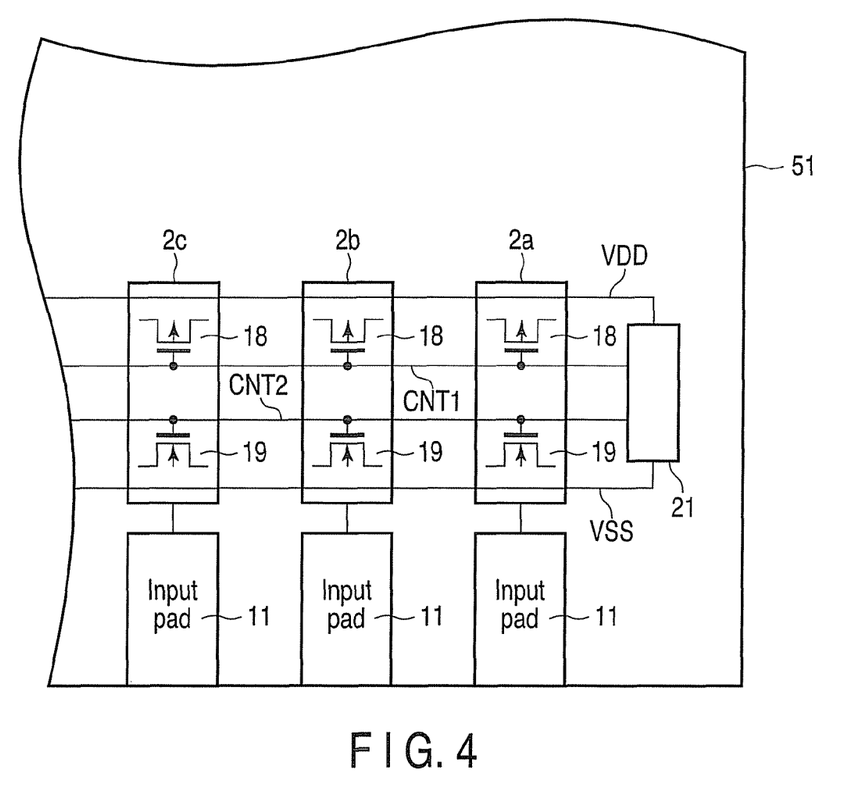
FIG. 4 is a view schematically showing a part of a semiconductor chip having the ESD protection circuit of the first embodiment.

FIG. 4 shows this example. FIG. 4 schematically shows a part of a semiconductor chip having the protection circuit of the first embodiment. As shown in FIG. 4, a plurality of input pads 11 are formed on a semiconductor chip 51. Circuits 2a, 2b, and 2c each obtained by excluding the detection circuit 21 from the protection circuit 2 shown in FIG. 1 are formed for the input pads 11. The circuits 2a, 2b, and 2c share the power supply potential line VDD and common potential line VSS. One detection circuit 21 supplies control signals CNT1 and CNT2 to the gate terminals of a pair of transistors 18 and 19, respectively, for each input pad 11. It is of course also possible to form the protection circuit 2 shown in FIG. 1 for each input pad 11.

In the protection circuit according to the first embodiment of the present invention, the source terminals of the transistors 15 and 16 having gate terminals connected to the input pad 11 are respectively disconnected from the power supply potential line VDD and common potential line VSS while an electric current that cannot be completely discharged by the inter-power supply protection circuit 14 flows through the protection circuit 2. This avoids a steep surge current faster than the operation of the inter-power supply protection circuit 14 from applying a high voltage between the gate and source terminals of each of the transistors 15 and 16. Accordingly, destruction of the transistors 15 and 16 can be prevented.

Second Embodiment

The second embodiment differs from the first embodiment in the arrangement of a detection circuit 21.

Figure 5:
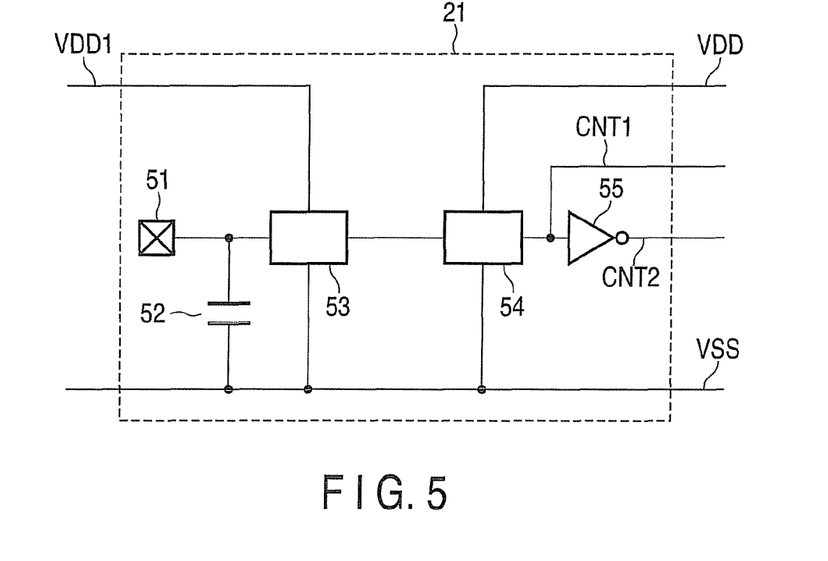
FIG. 5 is a circuit diagram schematically showing an ESD protection circuit according to a second embodiment.

FIG. 5 is a circuit diagram schematically showing an ESD protection circuit according to the second embodiment of the present invention. As shown in FIG. 5, an input enable terminal 51 is connected to a common potential line VSS via a capacitor 52. The input enable terminal 51 is connected to the input terminal of a buffer circuit 53 as well. The buffer circuit 53 can be formed by, e.g., an even number of (e.g., two) inverters connected in series.

A power supply potential line VDD1 and common potential line VSS respectively supply a power supply potential and common potential to the buffer circuit 53. The power supply potential line VDD1 is independent of a power supply potential VDD, and receives a constant power supply potential VDD1 from, e.g., a power supply circuit (not shown). The power supply potential line VDD1 is a power supply line for supplying a voltage higher than the power supply potential VDD. The buffer circuit 53 outputs signals for setting the power supply potential VDD1 at High level and the common potential VSS at Low level.

The output terminal of the buffer circuit 53 is connected to the input terminal of a Low-level shifter 54. The power supply potential line VDD and common potential line VSS respectively supply the power supply potential VDD and common potential VSS to the Low-level shifter 54. The Low-level shifter 54 has a function of converting the inverted signal of a signal supplied to the input terminal into the level of the power supply potential applied to the Low-level shifter 54, and outputting the signal. That is, the Low-level shifter 54 outputs signals for setting the power supply potential VDD at High level and the common potential VSS at Low level. A configuration taking any form having this function can be used as the Low-level shifter.

A control signal CNT1 is extracted from the output terminal of the Low-level shifter 54. This output terminal of the Low-level shifter 54 is connected to the input terminal of an inverter 55. A control signal CNT2 is extracted from the output terminal of the inverter 55.

The operation of the detection circuit 21 of the second embodiment will be explained below with reference to FIGS. 1 and 5. First, in a normal state, the power supply potential VDD (i.e., High level) is applied to the input enable terminal 51. Accordingly, a High-level signal is supplied to the input terminal of the Low-level shifter 54 via the buffer circuit 53. Since the output of the Low-level shifter is at Low level, therefore, the control signal CNT1 is at High level, and the control signal CNT2 is at Low level. As a consequence, transistors 18 and 19 shown in FIG. 1 are ON.

On the other hand, when a surge current is applied to an input pad 11, the potential of the power supply potential line VDD rises. Although the potential of the power supply potential line VDD rises, the potential of the input terminal of the Low-level shifter 54 does not rise but remains at High level. Therefore, the input terminal of the Low-level shifter 54 is also at High level. However, the potential of the input terminal of the Low-level shifter 54 changes to Low level relative to the potential, which is raised by the surge current, of the power supply potential line VDD. Consequently, the control signal CNT1 is at High level and the control signal CNT2 is at Low level during a period in which overshoot occurs in the surge current (a period in which an inter-power supply protection circuit 14 is not rapid enough to discharge the surge current). Accordingly, the transistors 18 and 19 shown in FIG. 1 are turned off, and transistors 15 and 16 are respectively disconnected from the power supply potential line VDD and common potential line VSS.

When the surge current is discharged and the potential of the power supply potential line VDD returns to the original state after that, the control signals CNT1 and CNT2 respectively change to Low-level and High-level again. As a result, the transistors 18 and 19 are turned on.

In the ESD protection circuit according to the second embodiment, the source terminals of the transistors 15 and 16 having gate terminals connected to the input pad 11 are respectively disconnected from the power supply potential line VDD and common potential line VSS while an electric current that cannot be discharged by the inter-power supply protection circuit 14 flows through a protection circuit 2, as in the first embodiment. Therefore, the same effect as in the first embodiment is obtained.

Third Embodiment

The third embodiment is directed to an ESD protection circuit applied to an output unit.

Figure 6:
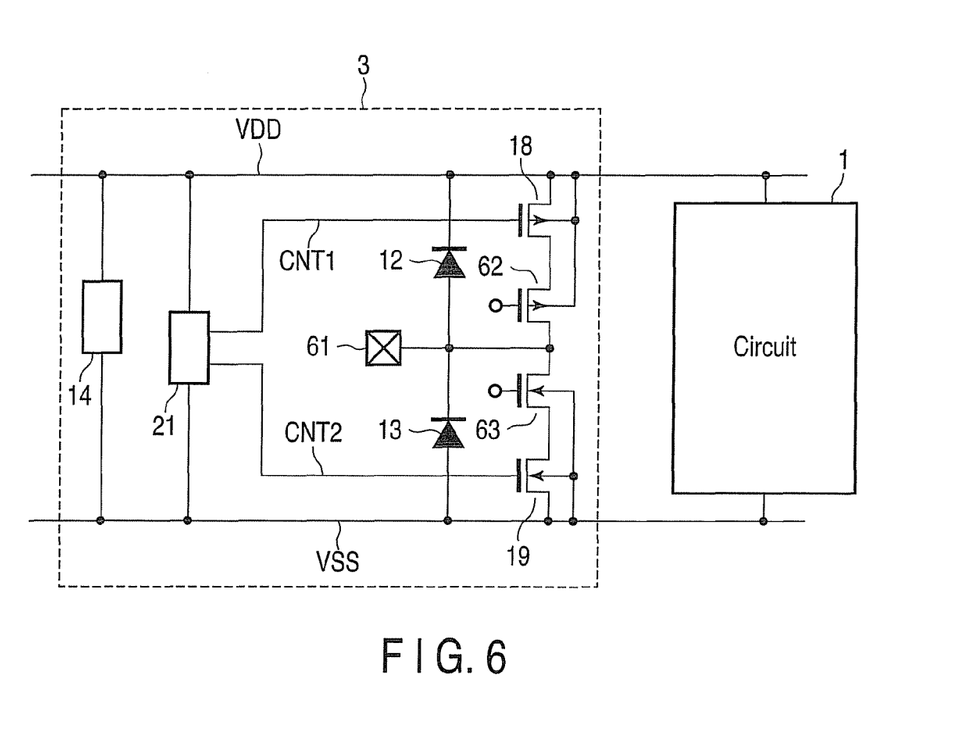
FIG. 6 is a circuit diagram schematically showing an ESD protection circuit according to a third embodiment.

FIG. 6 is a circuit diagram schematically showing the ESD protection circuit according to the third embodiment of the present invention. As shown in FIG. 6, an output pad 61 is connected to a connection node between the anode of a diode 12 and the cathode of a diode 13. The output pad 61 is connected to one terminal (drain terminal) of a p-type MOSFET 62, and one terminal (drain terminal) of an n-type MOSFET 63. The other terminal of the transistor 62 is connected to one terminal (drain terminal) of a transistor 18. The other terminal of the transistor 63 is connected to one terminal (drain terminal) of a transistor 19. The output pad 61 may also be connected to one terminal of the transistor 62 and one terminal of the transistor 63 via resistors. The gate terminals of the transistors 62 and 63 are connected to the output terminal of a pre-buffer circuit (not shown). The rest of the arrangement is the same as that of the first embodiment. Also, a detection circuit 21 can have the arrangement described in the first embodiment, or the arrangement described in the second embodiment. Furthermore, similar to FIG. 4, a circuit obtained by excluding the detection circuit 21 from FIG. 3 may also be formed for each of a plurality of output pads 61, and a plurality of circuits may share one detection circuit 21.

The operation is also the same as that of the first embodiment. An outline is as follows. In a normal state, a power supply potential VDD is applied to the terminal, which is positioned on the side of a power supply potential line, of a capacitor 41 shown in FIG. 3, so control signals CNT1 and CNT2 are respectively at Low and High levels. Consequently, the transistors 18 and 19 shown in FIG. 1 are ON.

When a surge current that is positive with respect to the potential of a common potential line VSS is applied to the output pad 61, the potential of a power supply potential line VDD rises. If the response speed of an inter-power supply protection circuit 14 is low, the surge current applied from the output pad 61 is not discharged. As a result, overshoot occurs in the waveform of the potential of the power supply potential line VDD, and the surge current flows into the common potential line VSS.

The detection circuit 21 detects this overshoot, and outputs a High-level control signal CNT1 and Low-level control signal CNT2. Consequently, the transistors 18 and 19 are turned off, and the source terminals of the transistors 62 and 63 are respectively disconnected from the power supply potential line VDD and common potential line VSS.

An npn-type bipolar transistor is formed in the transistor 62, and a pnp-type bipolar transistor is formed in the transistor 63. When a surge current is applied to the output pad 61, a high voltage is applied across the two terminals of each of these parasitic bipolar transistors. As a consequence, these bipolar transistors unexpectedly operate to destroy the transistors 62 and 63 in some cases.

By contrast, in this embodiment, while an overshoot voltage is generated by the surge current, the source terminals of the transistors 62 and 63 are respectively disconnected from the power supply potential line VDD and common potential line VSS. This makes it possible to prevent the overshoot voltage from being applied to the two terminals of the transistor 63.

Note that the substrate of the transistor 63 is also connected to the common potential line, so the overshoot voltage is applied between the substrate and drain terminal of the transistor 63 as well. However, the breakdown voltage between the substrate and drain terminal is generally higher than that between the source and gate terminals. Therefore, even when there is no measure to cope with an overcurrent that cannot be completely discharged by the inter-power supply protection circuit 14, dielectric breakdown hardly occurs between the source and gate terminals of the transistor 63.

The explanation up to this point has described the case where a positive potential is applied to the output pad 61. However, the above explanation similarly applies to the case where a negative potential is applied. That is, if it is detected that the inter-power supply protection circuit 14 has failed to discharge the surge current, the source terminal of the transistor 62 is disconnected form the power supply potential line VDD. This avoids a high voltage from being applied between the source and gate terminals of the transistor 62.

In the ESD protection circuit according to the third embodiment, the source terminals of the transistors 62 and 63 having the drain terminals connected to the output pad 61 are respectively disconnected from the power supply potential line VDD and common potential line VSS while an electric current that cannot be completely discharged by the inter-power supply protection circuit 14 flows through a protection circuit 3. This avoids a steep surge current faster than the operation of the inter-power supply protection circuit 14 from applying a high voltage between the two terminals of each of the transistors 62 and 63. This makes it possible to prevent the parasitic bipolar transistors from operating and destroying the transistors 62 and 63.

Each embodiment of the present invention can provide an ESD protection circuit capable of protecting internal circuits from a steep surge current.

Those skilled in the art can reach various changes and modifications without departing from the spirit and scope of the present invention. Therefore, it is to be understood that these changes and modifications also belong to the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic discharge (ESD) protection circuit comprising:
    a first power supply potential terminal to which a first power supply potential is applied;
    a reference potential terminal to which a reference potential is applied;
    an input terminal provided between the first power supply potential terminal and the reference potential terminal;
    a discharge circuit which holds a potential difference between the first power supply potential terminal and the reference potential terminal at a predetermined value;
    a first p-type MOSFET having a gate connected to the input terminal;
    a first n-type MOSFET having a gate connected to the input terminal;
    a second n-type MOSFET connected between the first n-type MOSFET and the reference potential terminal, and having a gate to which a first control signal is supplied; and
    a detection circuit connected between the first power supply potential terminal and the reference potential terminal, the detection circuit outputting the first control signal which turns on the second n-type MOSFET while the potential difference between the first power supply potential terminal and the reference potential terminals is held at the predetermined value, and outputting the first control signal which turns off the second n-type MOSFET while the potential difference between the first power supply potential terminal and the reference potential terminal deviates from the predetermined value.

2. The circuit according to claim 1, further comprising a second p-type MOSFET connected between the first p-type MOSFET and the first power supply potential terminal, and having a gate to which a second control signal is supplied,
    wherein the detection circuit outputs the second control signal which turns on the second p-type MOSFET while the potential difference is held at the predetermined value, and outputs the second control signal which turns off the second p-type MOSFET while the potential difference deviates from the predetermined value.

3. The circuit according to claim 1, wherein
    the detection circuit includes a capacitance element, and a resistance element,
    one terminal of the capacitance element is connected to the first power supply potential terminal, and
    the resistance element has one terminal connected to the other terminal of the capacitance element and the other terminal connected to the reference potential terminal, and outputs the second control signal from one terminal.

4. The circuit according to claim 2, wherein
    the detection circuit includes a second power supply potential terminal, a control signal input terminal, a capacitance element, a buffer, a level shifter, and an inverter,
    the capacitance element is inserted between the control signal input terminal and the reference potential terminal,
    the buffer operates by using a second power supply potential applied from the second power supply potential terminal, has an input terminal connected to the control signal input terminal, and outputs a signal by using the second power supply potential and the reference potential,
    the level shifter converts the signal output from the buffer into a signal using the first power supply potential and the reference potential, and outputs the signal as the second control signal, and
    the inverter outputs, as the first control signal, an inverted signal of the second control signal output from the level shifter.

5. The circuit according to claim 2, wherein the detection circuit detects overshoot occurring when a surge current is applied to the input terminal, and outputs the second control signal which turns off the second p-type MOSFET and the first control signal which turns off the second n-type MOSFET.

6. The circuit according to claim 5, wherein a period during which the potential difference between the first power supply potential terminal and the reference potential terminal deviates from the predetermined value is a period during which the discharge circuit is unable to discharge the surge current.

7. The circuit according to claim 1, wherein
a period during which the potential difference between the first power supply potential terminal and the reference potential terminal is held at the predetermined value is a normal operation period, and
a period during which the potential difference deviates from the predetermined value is a period during which a surge current is applied to the input terminal and overshoot occurs.

8. The circuit according to claim 1, wherein the input terminal is connected to the first power supply potential terminal via a first diode, and connected to the reference potential terminal via a second diode.

9. The circuit according to claim 1, wherein
drains of the first p-type MOSFET and the first n-type MOSFET are connected, and
a substrate of the first p-type MOSFET is connected to the first power supply potential terminal, and a substrate of the first n-type MOSFET is connected to the reference potential terminal.

10. The circuit according to claim 9, wherein a substrate of the second p-type MOSFET is connected to the first power supply potential terminal, and a substrate of the second n-type MOSFET is connected to the reference potential terminal.

11. An electrostatic discharge (ESD) protection circuit comprising:
a first power supply potential terminal to which a first power supply potential is applied;
a reference potential terminal to which a reference potential is applied;
an output terminal provided between the first power supply potential terminal and the reference potential terminal;
a discharge circuit which holds a potential difference between the first power supply potential terminal and the reference potential terminal at a predetermined value by discharging an overcurrent applied to one of the first power supply potential terminal and the reference potential terminal;
a first p-type MOSFET having a gate to which a first signal is supplied;
a first n-type MOSFET having a gate to which a second signal is supplied;
a second n-type MOSFET connected between the first n-type MOSFET and the reference potential terminal, and having a gate to which a second control signal is supplied; and
a detection circuit connected between the first power supply potential terminal and the reference potential terminal, the detection circuit outputting the first control signal which turns on the second n-type MOSFET while the potential difference between the first power supply potential terminal and the reference potential terminals is held at the predetermined value, and outputting the first control signal which turns off the second n-type MOSFET while the potential difference between the first power supply potential terminal and the reference potential terminal deviates from the predetermined value.

12. The circuit according to claim 11, further comprising a second p-type MOSFET connected between the first p-type MOSFET and the first power supply potential terminal, and having a gate to which a second control signal is supplied,
wherein the detection circuit outputs the second control signal which turns on the second p-type MOSFET while the potential difference is held at the predetermined value, and outputs the second control signal which turns off the second p-type MOSFET while the potential difference deviates from the predetermined value.

13. The circuit according to claim 11, wherein
the detection circuit includes a capacitance element, and a resistance element,
one terminal of the capacitance element is connected to the first power supply potential terminal, and
the resistance element has one terminal connected to the other terminal of the capacitance element and the other terminal connected to the reference potential terminal, and outputs the second control signal from one terminal.

14. The circuit according to claim 12, wherein
the detection circuit includes a second power supply potential terminal, a control signal input terminal, a capacitance element, a buffer, a level shifter, and an inverter,
the capacitance element is inserted between the control signal input terminal and the reference potential terminal,
the buffer operates by using a second power supply potential applied from the second power supply potential terminal, has an input terminal connected to the control signal input terminal, and outputs a signal by using the second power supply potential and the reference potential,
the level shifter converts the signal output from the buffer into a signal using the first power supply potential and the reference potential, and outputs the signal as the second control signal, and
the inverter outputs, as the first control signal, an inverted signal of the second control signal output from the level shifter.

15. The circuit according to claim 12, wherein the detection circuit detects overshoot occurring when a surge current is applied to the output terminal, and outputs the second control signal which turns off the second p-type MOSFET and the first control signal which turns off the second n-type MOSFET.

16. The circuit according to claim 15, wherein a period during which the potential difference between the first power supply potential terminal and the reference potential terminal deviates from the predetermined value is a period during which the discharge circuit is unable to discharge the surge current.

17. The circuit according to claim 11, wherein
a period during which the potential difference between the first power supply potential terminal and the reference potential terminal is held at the predetermined value is a normal operation period, and
a period during which the potential difference deviates from the predetermined value is a period during which a surge current is applied to the output terminal and overshoot occurs.

18. The circuit according to claim 11, wherein the output terminal is connected to the first power supply potential terminal via a first diode, and connected to the reference potential terminal via a second diode.

19. The circuit according to claim 11, wherein
drains of the first p-type MOSFET and the first n-type MOSFET are connected, and
a substrate of the first p-type MOSFET is connected to the first power supply potential terminal, and a substrate of the first n-type MOSFET is connected to the reference potential terminal.

20. The circuit according to claim 19, wherein a substrate of the second p-type MOSFET is connected to the first power supply potential terminal, and a substrate of the second n-type MOSFET is connected to the reference potential terminal.

* * * * *